(12) United States Patent
Marenco et al.

(10) Patent No.: US 9,440,534 B2
(45) Date of Patent: Sep. 13, 2016

(54) AUTOMOTIVE GAS PEDAL MANAGEMENT TO INCREASE DRIVING SAFETY AND REDUCE FUEL CONSUMPTION AND EXHAUST GAS EMISSION IN MOTOR VEHICLES

(71) Applicant: C.R.F. SOCIETA' CONSORTILE PER AZIONI, Orbassano (IT)

(72) Inventors: Silvano Marenco, Orbassano (IT); Maurizio Miglietta, Orbassano (IT); Massimo Gaido, Orbassano (IT); Vincenzo Murdocco, Orbassano (IT)

(73) Assignee: C.R.F. Societa' Consortile Per Azioni, Orbassano (IT)

( * ) Notice: Subject to any disclaimer, the term of this patent is extended or adjusted under 35 U.S.C. 154(b) by 11 days.

(21) Appl. No.: 14/411,469

(22) PCT Filed: Jul. 5, 2013

(86) PCT No.: PCT/IB2013/055524
§ 371 (c)(1),
(2) Date: Dec. 26, 2014

(87) PCT Pub. No.: WO2014/006602
PCT Pub. Date: Jan. 9, 2014

(65) Prior Publication Data
US 2015/0322868 A1 Nov. 12, 2015

(30) Foreign Application Priority Data
Jul. 6, 2012 (IT) .............................. TO2012A0599

(51) Int. Cl.
*G06F 7/00* (2006.01)
*B60K 26/04* (2006.01)
(Continued)

(52) U.S. Cl.
CPC ............. *B60K 26/04* (2013.01); *F02D 11/105* (2013.01); *B60K 2026/046* (2013.01); *F02D 2041/286* (2013.01); *F02D 2200/501* (2013.01); *F02D 2200/602* (2013.01); *F02D 2400/11* (2013.01)

(58) Field of Classification Search
CPC ....... F02D 11/05; F02D 11/10; G07C 5/008; B60K 31/00
USPC ............... 701/93, 110, 123, 54, 55; 180/170
See application file for complete search history.

(56) References Cited

U.S. PATENT DOCUMENTS 6,078,860 A 6/2000 Kerns
6,202,021 B1 3/2001 Kresse et al.
(Continued)

FOREIGN PATENT DOCUMENTS

CN 101344990 A 1/2009
EP 0647773 A2 4/1995
(Continued)

OTHER PUBLICATIONS

International Search Report and Written Opinion dated Dec. 3, 2013 from International Patent Application No. PCT/IB2013/055524 filed Jul. 5, 2013.

*Primary Examiner* — Thomas G Black
*Assistant Examiner* — Luke Huynh
(74) *Attorney, Agent, or Firm* — Sunstone IP

(57) ABSTRACT

An automotive accelerator device includes an accelerator member movable in response to driver operation, a position sensor associated with the accelerator member to output a position signal indicating an operation degree of the accelerator member, and signal processing means configured to receive the position signal generated by the position sensor and to generate a command for a motor vehicle engine based on the position signal and a characteristic curve of the accelerator device that defines the command for the motor vehicle engine as a function of the position signal; the signal processing means are further configured to: receive signals indicating a current motor vehicle speed and a target motor vehicle speed, and to dynamically adapt the accelerator device characteristic curve based on the current motor vehicle speed with respect to the target motor vehicle speed.

15 Claims, 3 Drawing Sheets

(51) Int. Cl.
*F02D 11/10* (2006.01)
*F02D 41/28* (2006.01)

(56) References Cited

U.S. PATENT DOCUMENTS

| | | |
|---|---|---|
| 6,246,951 B1 | 6/2001 | Robichaux et al. |
| 6,304,810 B1 | 10/2001 | Westerberg |
| 6,428,448 B2 | 8/2002 | Saito et al. |
| 6,654,677 B2 * | 11/2003 | Weber .............. F02D 11/105 477/62 |
| 6,728,622 B2 | 4/2004 | Mayer |
| 6,789,009 B2 | 9/2004 | Schmitz et al. |
| 7,319,927 B1 * | 1/2008 | Sun .............. B60W 10/06 180/170 |
| 7,493,981 B2 | 2/2009 | Kustosch et al. |
| 8,301,341 B2 * | 10/2012 | Taguchi .............. B60T 7/042 701/41 |
| 2008/0300768 A1 | 12/2008 | Hijikata |
| 2011/0238272 A1 * | 9/2011 | Kato .............. B60W 10/06 701/55 |

FOREIGN PATENT DOCUMENTS

| | | |
|---|---|---|
| FR | 2755650 A1 | 5/1998 |
| WO | 01/47735 A2 | 7/2001 |

* cited by examiner

AUTOMOTIVE GAS PEDAL MANAGEMENT TO INCREASE DRIVING SAFETY AND REDUCE FUEL CONSUMPTION AND EXHAUST GAS EMISSION IN MOTOR VEHICLES

TECHNICAL FIELD OF INVENTION

The present invention relates to automotive gas pedal management aimed at increasing driving safety and reducing fuel consumption and exhaust gas emissions of motor vehicles.

STATE OF THE ART

Automotive manufacturers are considering various solutions to increase driving safety and to reduce the fuel consumption and exhaust gas emissions of motor vehicles; of these, a large number are based on controlling vehicle speed, which also includes those based on gas/accelerator pedal management.

Some of these solutions are described in U.S. Pat. No. 6,202,021, U.S. Pat. No. 6,246,951 U.S. Pat. No. 6,304,810, U.S. Pat. No. 6,428,448, U.S. Pat. No. 6,728,622, U.S. Pat. No. 6,789,009, U.S. Pat. No. 7,493,981, WO 01/47735, FR 2,755,650 and CN 101344990.

In particular, U.S. Pat. No. 6,246,951 describes a system for controlling a vehicular powertrain including an internal combustion engine, in which a signal indicative of the driver-requested engine output and a signal indicative of the current vehicle speed are first generated, after which a reference engine output parameter, based on the signal indicative of the driver-requested engine output and the signal indicative of the current vehicle speed, and a value indicative of the current atmospheric pressure are determined, the reference engine output parameter then being modified on the basis of the value indicative of the current atmospheric pressure and the internal combustion engine controlled on the basis of the modified reference engine output parameter.

In one embodiment, the basic driver-requested engine torque is adjusted on the basis of the barometric pressure to preserve full accelerator pedal travel and prevent the driver having a "dead pedal" sensation when operating the vehicle at high altitudes and maximum engine torque. The position of the accelerator pedal is thus interpreted as a request for a portion or percentage of the currently available engine torque or power, which varies as a function of the barometric pressure.

SUBJECT AND SUMMARY OF THE INVENTION

The object of the present invention is to provide a relatively simple and inexpensive solution that can be easily adopted in motor vehicles already on the market to increase driving safety and reduce fuel consumption and exhaust gas emissions.

This object is achieved by the present invention in so far as it relates to an automotive accelerator device, as defined in the appended claims.

Broadly speaking, unlike known solutions, and the solution described in U.S. Pat. No. 6,246,951 in particular, where the response of the accelerator pedal is modified in order to cancel engine power "dead zones" that occur as the atmospheric pressure drops, thereby allowing to continue having an increase in engine power as pressure on the pedal increases, in the present invention "dead zones" are instead expressly created where increasing pressure on the accelerator pedal does not correspond to an increase in engine torque or corresponds to a limited increase.

In essence, this is obtained by dynamically modifying the characteristic curve of the accelerator pedal as a function of current vehicle speed with respect to a target vehicle speed (given, for example, by speed limits, an ECO profile, the speed of the vehicle in front, etc.), on the basis of which three vehicle speed zones are identified, for which there are three different corresponding accelerator pedal characteristic curves. These characteristic curves change dynamically, based on the target vehicle speed.

DETAILED DESCRIPTION OF PREFERRED EMBODIMENTS OF THE INVENTION

The present invention will now be described in detail with reference to the attached figures, to enable an expert in the field to embody and practice the present invention. Various modifications to the described embodiments will be immediately obvious to experts in the field, and the generic principles described herein can be applied to other embodiments and applications without departing from the scope of the present invention, as defined in the appended claims. Thus, the present invention is not intended to be limited to the embodiments set forth herein, but is to be accorded the widest scope consistent with the characteristics described and claimed herein.

The 'Adaptive Gas Pedal' function consists in intelligently managing the accelerator pedal of a motor vehicle for the purpose of:
  increasing on-board vehicle safety (in terms of respecting speed and safety distance limits) and comfort (stress-free driving);
  reducing fuel consumption and exhaust gas emissions;
  reducing visual and acoustic feedback and the consequent distractions that they can cause.

Some possible applications are:
  Enhanced Speed Limiter, in order to limit vehicle speed to the legal road limits;
  Distance/Collision Warning, with the aim of warning the driver in event of danger due to a head-on obstruction; and
  Preventive Eco Drive, in order to reduce fuel consumption and exhaust gas emissions on sections of road that are regularly driven along.

The 'Adaptive Gas Pedal' function dynamically changes (in real-time) the characteristic curve of the accelerator pedal of a motor vehicle on the basis of the vehicle's speed with respect to a target speed. This target vehicle speed can be supplied from different sources, such as, for example:
  a telecamera with the function of Traffic Sign Recognition (TSR), which recognises road signs;
  digital maps containing speed limits (eHorizon);

standard speed limiter, used by the driver to set a desired speed limit value.

Figure 1:
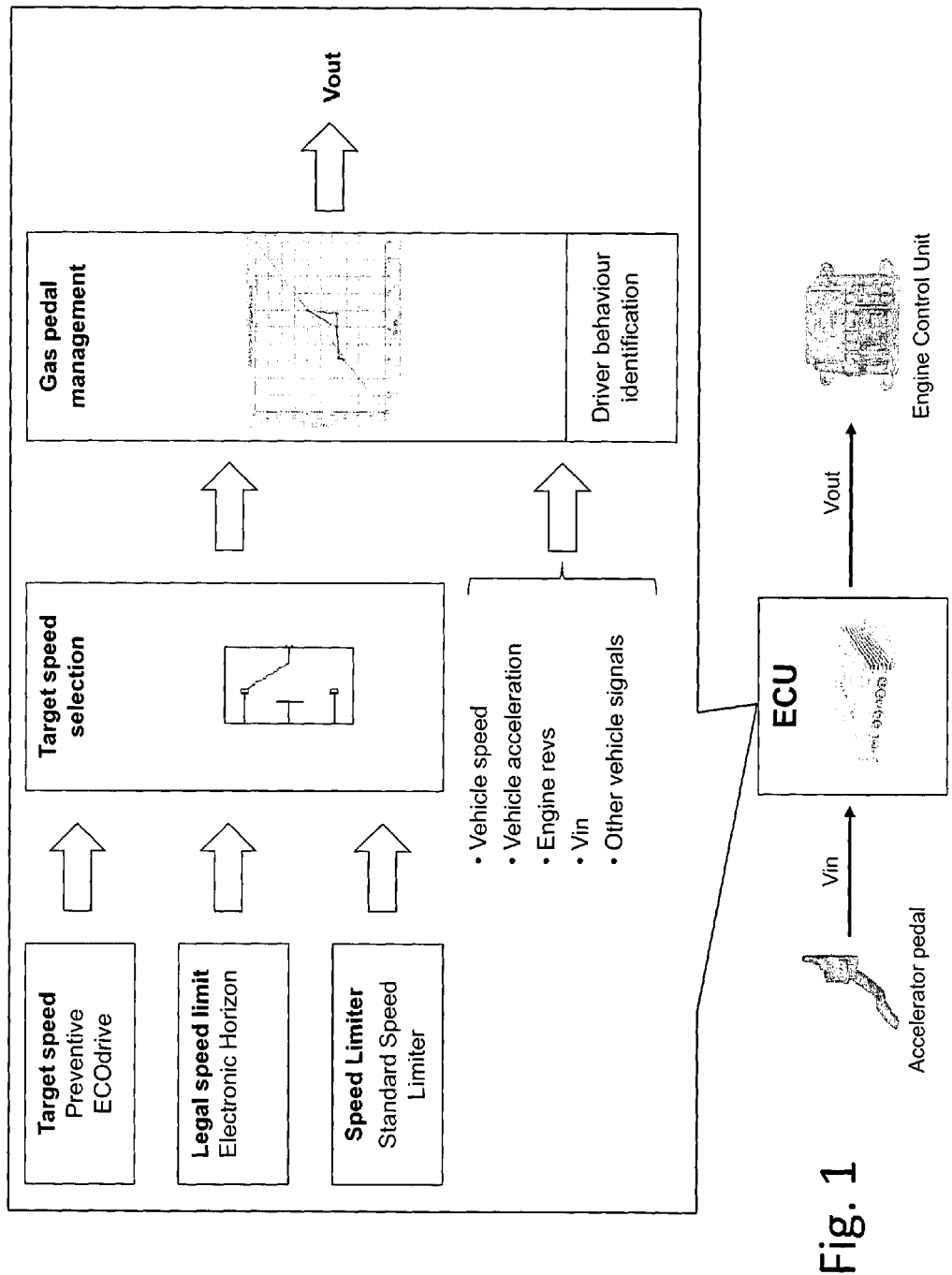
FIG. 1 shows a block diagram of an automotive accelerator device according to one embodiment of the present invention.

FIG. 1 shows a self-explaining block diagram of an automotive accelerator device according to the present invention in its application as an Enhanced Speed Limiter.

Three different target speed sources can be seen in the example shown in FIG. 1: Preventive ECOdrive, Electronic Horizon (digital maps) and Standard Speed Limiter. Only one of these target speeds is selected in the "Target speed selection" block (in the case where more than one target speed is present and available). Based on the difference between the target speed and the current speed of the vehicle and on other vehicle signals (engine revs, acceleration, etc.), the accelerator device's characteristic curve is dynamically changed in the "Gas pedal management" block.

In particular, the automotive accelerator device comprises an accelerator member operable by the driver, in the form of a pedal in the example shown, although it could also take the form of a member located on the steering wheel for fingertip operation, and two potentiometers associated with the accelerator pedal to each output a voltage proportional to the degree of operation of the accelerator member. The Adaptive Gas Pedal function consists of intercepting these signals via a dedicated control unit (ECU) and generating two new voltages based on the target speed, the current vehicle speed and other automotive quantities such as engine revs, longitudinal and lateral acceleration, etc.; the new voltage values are then sent to the engine control unit (see FIG. 2).

Figure 2:
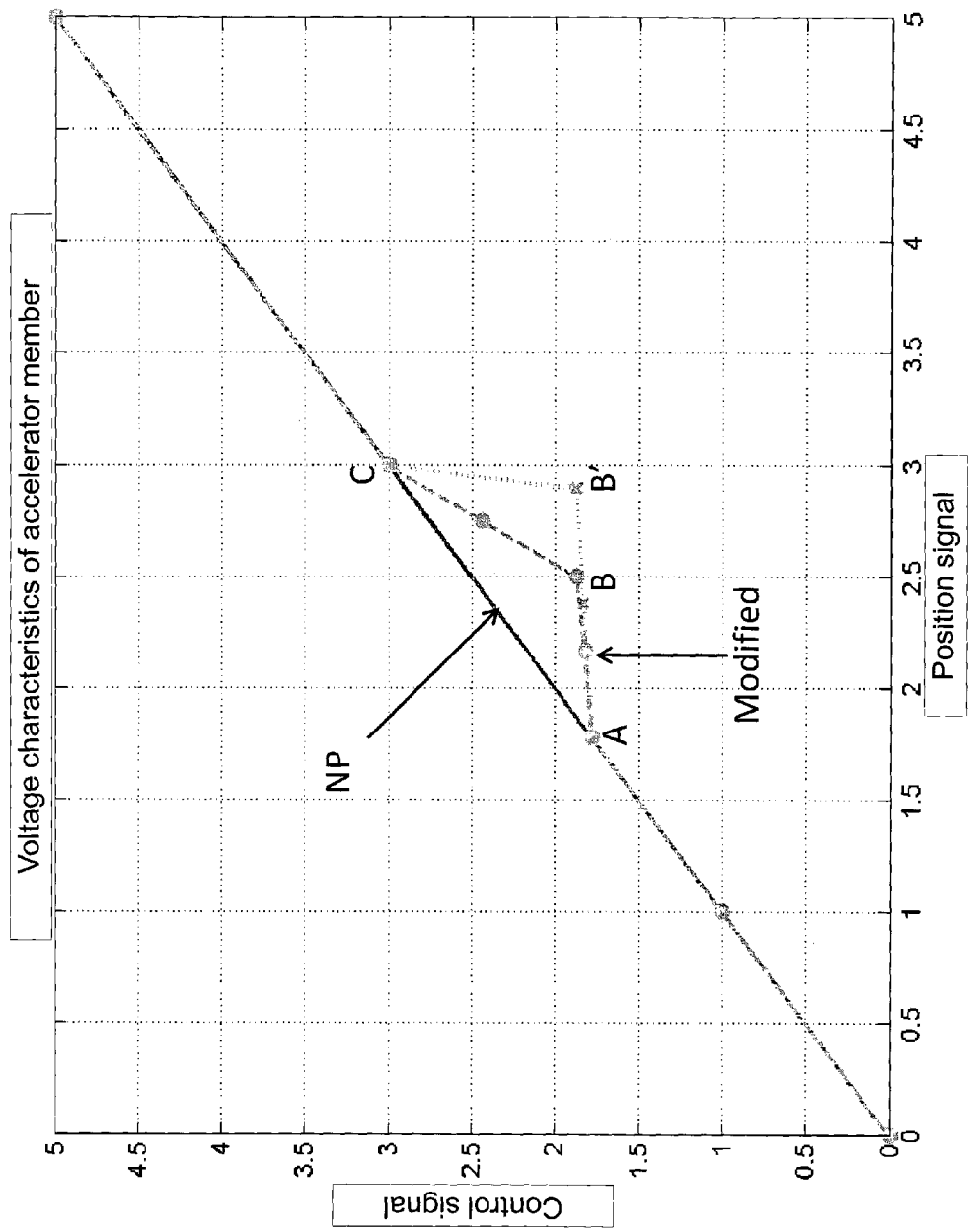
FIG. 2 shows a normal production characteristic curve and a modified characteristic curve of the automotive accelerator device.

FIG. 2 shows an example of how the accelerator device's characteristic curve is modified. The standard characteristic curve (normal production) of an accelerator pedal is shown in dark grey, where the output voltage value (Voltage out) corresponds to a same input voltage value (Voltage in) and is fed to the engine control unit. A possible characteristic curve modified by the ECU is shown instead in light grey. In particular, three pairs of points, indicated by the letters A, B and C, can be noted. The algorithm dynamically calculates these points and their position will affect the response of the accelerator device. It should be noted that in the example shown, three pairs of points are identified, but the accelerator device's new characteristic curve can be segmented with N pairs and therefore assume different shapes.

Figure 3:
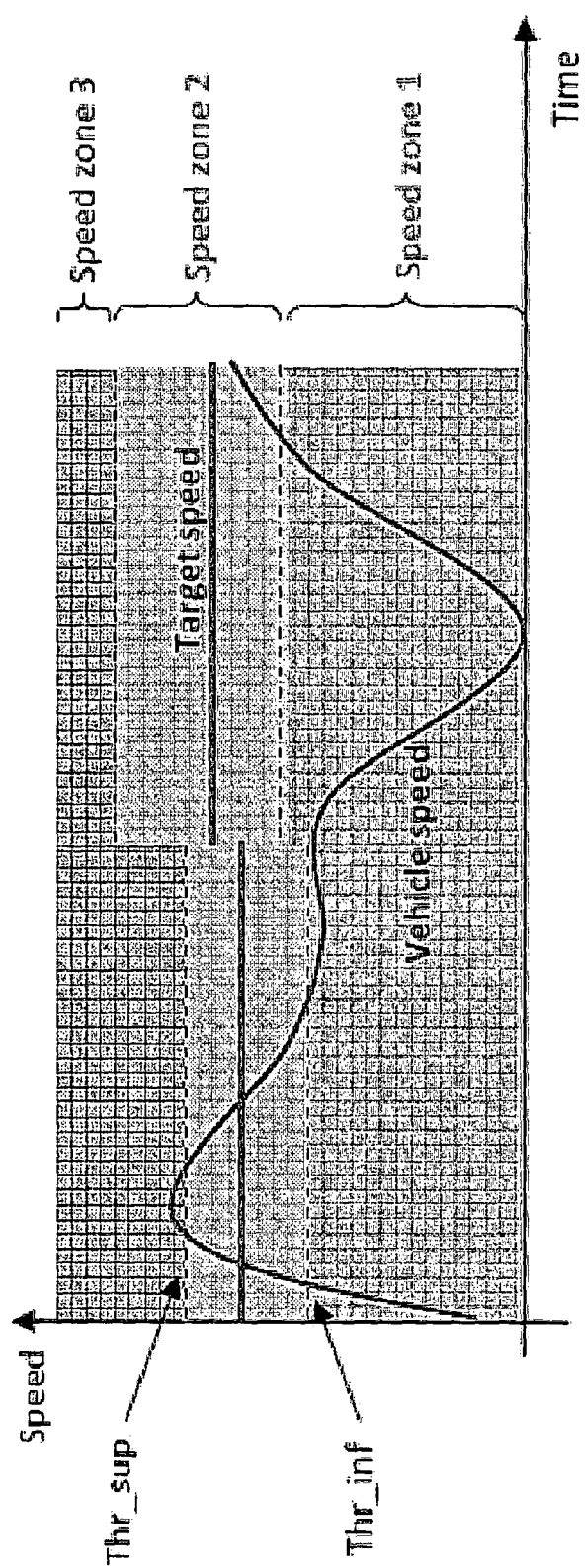
FIG. 3 shows a graph indicative of different vehicle speed ranges involved in the management of the automotive accelerator device.

As shown in FIG. 3, the generation of the modified curve of the accelerator device (and therefore the position of points A, B and C) depends on the current vehicle speed (Vveh) with respect to the target speed (Vtarg) and, in particular, the speed zone in which it falls. The speed zones are delimited by a lower threshold speed (Thr_inf) and an upper threshold speed (Thr_sup). For each speed zone there is a different corresponding accelerator device curve, and therefore a different response.

In particular:
if Vveh≤Thr_inf, then the accelerator device has a standard curve and the pedal responds normally (NP— Normal Production), i.e. the characteristic curve is formed by a straight line with a 45° slope and the proportionality coefficient between input voltage (Voltage in) and output voltage (Voltage out) is therefore unitary;
if Thr_inf<Vveh≤Thr_sup, then the accelerator device has a characteristic curve with a moderate slope, less than the NP curve, in a certain interval of its travel and therefore the torque requested via the engine control unit will be less than the NP requirement;
if Vveh>Thr_sup, then the accelerator device has a flat, almost null curve in a certain interval of its travel and therefore no torque will be requested via the engine control unit (cut-off).

According to a different aspect of the present invention, in any speed zone, the Adaptive Gas Pedal function is automatically deactivated if at least one of the following events arises:
pressing the accelerator pedal beyond a certain threshold, corresponding to point C (e.g. 90% of accelerator pedal travel). On the x-axis, point B can be more or less close to point C depending on how rapidly it is wished to make the connection between the modified characteristic curve and the NP curve;
rapidly pressing the accelerator pedal, i.e. when the position gradient of the accelerator pedal exceeds a certain threshold;
when a specially provided driver behaviour identification algorithm recognises a particular driving manoeuvre, for example, an overtaking manoeuvre, exiting a roundabout, aggressive longitudinal/lateral driving, or a sudden manoeuvre (e.g. to avoid an obstacle). In these cases, the function is temporarily disabled until the situation is no longer hazardous and/or the driving style calms down.

The lower and upper thresholds are calculated as follows:

$$\text{Thr\_inf} = V\text{targ} \cdot \alpha$$

$$\text{Thr\_sup} = V\text{targ} \cdot \beta$$

where $\alpha$ and $\beta$ are the coefficients that define the amplitude of the three speed zones and are variable, depending on the application (for example, for the "enhanced speed limiter" application, $\alpha$ and $\beta$ could be set to 0.90 and 1.10, respectively, so as to reduce the request for torque if the vehicle's speed is within the range of Vtarg±10% and to cancel the request for torque if the vehicle's speed is higher than Vtarg+10%).

Obviously, $\alpha < \beta$.

As already mentioned, three pairs of points useful for defining the new characteristic curve of the pedal are calculated for each speed zone. These points refer to voltage values that the ECU generates and sends to the engine control unit and are defined as follows:

Speed zone 1: standard pedal curve $$A = (Ax, Ay)$$

$$B = (Bx, By)$$

$$C = (Cx, Cy)$$

where:
Ax=Ay=minimum voltage with pedal released (cut-off)
Bx=By=voltage corresponding to pedal pressed halfway down
Cx=Cy=voltage corresponding to flooring the pedal
Speed zone 2: curve slope reduction $$A = (Ax, Ay)$$

$$B = (Bx, By)$$

$$C = (Cx, Cy)$$

where:
Ax=Ay=voltage that would be obtained with the vehicle running regularly at speed Vtarg (value provided via an experimentally obtained lookup table)

Bx=voltage corresponding to the beginning of the connection between the modified curve and the NP curve By=voltage that would be obtained with the vehicle running regularly at speed Vtarg (value provided via an experimentally obtained lookup table)

Cx=Cy=voltage corresponding to flooring the pedal (e.g. 90% of travel)

Speed zone 3: cut-off $$A=(Ax,Ay)$$

$$B=(Bx,By)$$

$$C=(Cx,Cy)$$

where:

Ax=Ay=minimum voltage with pedal released (cut-off)

Bx=voltage corresponding to the beginning of the connection between the modified curve and the NP curve By=minimum voltage with pedal released (cut-off)

Cx=Cy=voltage corresponding to flooring the pedal (e.g. 90% of travel)

Normally, the accelerator device has the standard characteristic curve, whereas when the vehicle's speed passes from zone 1 to zone 2 or 3, the accelerator device will respond with the corresponding modified curve; the function is deactivated only when the accelerator pedal is pressed beyond a certain threshold (e.g. 90% of travel, point C).

Once deactivated, the function is re-enabled when the vehicle's speed drops below the target speed.

In the phase of releasing the accelerator pedal, the generated voltage will follow the input voltage if the latter is less than that corresponding to the curve of the current speed zone.

The passage from one characteristic curve to another is filtered with a different rate limiter depending on the situation (for example, variable between 1V/s 25V/s). The rate limiter is greater when passing to a higher speed zone and smaller when passing to a lower speed zone; this is to make the driver more aware of exceeding Vtarg and to gradually increase the vehicle's speed when it drops below Vtarg.

Modifications and variants can be made to the present invention without departing from the scope defined in the appended claims.

For example, in a different embodiment of the invention that is not shown, instead of being implemented in a dedicated ECU separate from and connected to the vehicle's engine control unit, the Adaptive Gas Pedal function is implemented directly in the engine control unit, thus omitting the dedicated ECU. In this embodiment of the invention, the two voltages supplied by the potentiometers associated with the accelerator pedal are processed by the engine control unit to generate commands for the vehicle's engine, which must be consistent with the requested engine torque, throttle valve opening, engine power, reference speed, etc.

The invention claimed is:

1. An automotive accelerator device comprising:
   an accelerator member movable in response to driver operation,
   a position sensor associated with the accelerator member to output a position signal indicating an operation degree of the accelerator member, and
   signal processing means configured to receive the position signal generated by the position sensor and to generate a command for a motor vehicle engine based on the position signal and a characteristic curve of the accelerator device that defines the command for the motor vehicle engine as a function of the position signal;
   the accelerator device being characterized in that the signal processing means are further configured to:
   receive a signal indicating a current motor vehicle speed,
   receive a signal indicating a target motor vehicle speed, and
   dynamically adapt the accelerator device characteristic curve based on the current motor vehicle speed with respect to the target motor vehicle speed;
   wherein dynamically adapting the accelerator device characteristic curve comprises:
   determining lower, intermediate and upper motor vehicle speed ranges based on the target motor vehicle speed; and
   dynamically adapting the accelerator device characteristic curve based on the current motor vehicle speed and the lower, intermediate and upper motor vehicle speed ranges such that:
   for current motor vehicle speeds within the lower motor vehicle speed range, the command is directly proportional to the position signal, via a first proportionality coefficient;
   for current motor vehicle speeds within the upper motor vehicle speed range, the command is substantially invariant as the position signal varies; and
   for current motor vehicle speeds within the intermediate motor vehicle speed range, the command is directly proportional to the position signal, via a second proportionality coefficient lower than the first proportionality coefficient.

2. The automotive accelerator device according to claim 1, wherein the lower motor vehicle speed range is defined by current motor vehicle speeds lower than a lower threshold speed, the upper motor vehicle speed range is defined by current vehicle speeds higher than an upper threshold speed, and the intermediate motor vehicle speed range is defined by current vehicle speeds between the lower and upper threshold speeds.

3. The automotive accelerator device according to claim 1, wherein the signal processing means are further configured to:
   disable the dynamic adaptation of the accelerator device characteristic curve if the operation degree of the accelerator member exceeds a threshold operation degree.

4. The automotive accelerator device according to claim 3, wherein the signal processing means are further configured to:
   re-enable the dynamic adaptation of the accelerator device characteristic curve if the current motor vehicle speed drops below the target motor vehicle speed.

5. The automotive accelerator device according to claim 1, wherein the signal processing means are further configured to:
   compute the lower and upper threshold speeds based on the target motor vehicle speed.

6. The automotive accelerator device according to claim 5, wherein the signal processing means are further configured to:
   compute the lower and upper threshold speeds based on the target motor vehicle speed and respective coefficients that depend on the type of application for which the dynamic adaptation of the accelerator device characteristic curve is intended.

7. The automotive accelerator device according to claim 6, wherein, if the dynamic adaptation of the accelerator device characteristic curve is intended to limit the current motor vehicle speed within legal limits provided for by an highway code, the coefficients are such as to result in the command for the motor vehicle engine causing a reduction in an engine torque request if the current motor vehicle speed is within a motor vehicle speed range around the target motor vehicle speed, and substantially a cancellation of the engine torque request if the current motor vehicle speed is higher than said motor vehicle speed range.

8. The automotive accelerator device according to claim 1, wherein the signal processing means are further configured to:
set an upper limit on a rate of change of the command for the motor vehicle engine when the current motor vehicle speed passes to a different speed range.

9. The automotive accelerator device according to claim 1, wherein the signal processing means are further configured to:
set an upper limit on a rate of change of the command for the motor vehicle engine at a higher speed limit when the current motor vehicle speed passes to a higher speed range, and
set an upper limit on the rate of change of the command for the motor vehicle engine at a lower speed limit when the current motor vehicle speed passes to a lower speed range.

10. The automotive accelerator device according to claim 1, wherein the signal processing means are further configured to:
during a release of the accelerator member, cause the magnitude of the command for the motor vehicle engine to follow that of the position signal if the latter is lower than that which the command would have within the motor vehicle speed range in response to the dynamic adaptation of the accelerator device characteristic curve.

11. The automotive accelerator device according to claim 1, wherein the signal processing means are constituted by an automotive signal processing unit separate from and connected to an automotive engine control unit.

12. The automotive accelerator device according to claim 1, wherein the signal processing means are implemented in an automotive engine control unit.

13. A vehicle comprising the automotive accelerator device according to claim 1.

14. An electronic signal processing unit for the automotive accelerator device, configured to implement the signal processing means as claimed in claim 1.

15. The electronic signal processing unit for the automotive accelerator device according to claim 14, the electronic signal processing unit programmed to execute an algorithm in software code designed to cause, when executed, the electronic signal processing unit to implement the signal processing means as claimed in claim 1.

* * * * *